United States Patent [19]

Kishi et al.

[11] 3,928,396
[45] Dec. 23, 1975

[54] ANTHRAQUINONE DYESTUFFS

[75] Inventors: Noboru Kishi; Yoshitaka Ota; Nobuyoshi Okuno, all of Kita-Kyushu, Japan

[73] Assignee: Mitsubishi Chemical Industries Ltd., Tokyo, Japan

[22] Filed: Apr. 16, 1973

[21] Appl. No.: 351,454

[30] Foreign Application Priority Data

| Apr. 15, 1972 | Japan | 47-38035 |
| Apr. 15, 1972 | Japan | 47-38035 |
| Apr. 15, 1972 | Japan | 47-38036 |

[52] U.S. Cl.................................. 260/380; 260/380
[51] Int. Cl.² ......................................... C09B 1/50
[58] Field of Search ................................... 260/380

[56] References Cited
UNITED STATES PATENTS

| 3,647,828 | 3/1972 | Spietschka et al. | 260/380 |
| 3,797,995 | 3/1974 | Renfrew et al. | 260/380 |

FOREIGN PATENTS OR APPLICATIONS

| 1,301,745 | 1/1973 | United Kingdom | 260/380 |
| 4,022,953 | 10/1965 | Japan | 260/380 |
| 7,010,098 | 1/1971 | Netherlands | |
| 7,032,547 | 10/1970 | Japan | 260/380 |

OTHER PUBLICATIONS

Chemical Abstracts, Vol. 77, 90063q (1972).
Chemical Abstracts, Vol. 71, 103176g (1969).
Chemical Abstracts, Vol. 67, 12523w (1967).

*Primary Examiner*—Lorraine A. Weinberger
*Assistant Examiner*—E. Jane Skelly
*Attorney, Agent, or Firm*—Oblon, Fisher, Spivak, McClelland & Maier

[57] ABSTRACT

Anthraquinone dyestuffs are dispersable dyestuffs having the formula

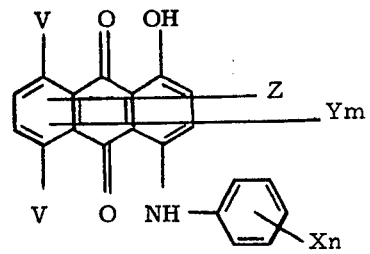

wherein V represents a hydroxy group at one position and an amino group at the second position; X and Y represent halogen atoms; $m$ and $n$ represent integers from 0 – 3; and Z represents a hydrogen atom, a halogen atom or a methyl group substituted at a position adjacent the hydroxy groups in the molecule. The anthraquinone dyestuffs of this invention are prepared by reducing anthraquinone dyestuffs containing a nitro group and two hydroxy groups, and if necessary, further halogenating the products obtained.

4 Claims, No Drawings

ANTHRAQUINONE DYESTUFFS

BACKGROUND OF THE INVENTION

1. Field of the Invention

This invention relates to dispersable anthrquinone dyestuffs which are valuable for coloring synthetic textile fibers especially polyester fibers, and which impart a clear blue to greenish blue color to the fibers. Fibers dyed with the dyestuffs have excellent fastness values and exhibit level dyeing properties. The invention also relates to a process for preparing the dyestuffs.

2. Description of the Prior Art

In the market, valuable textiles have been prepared from synthetic fibers, especially polyester fibers, and the finishing process for these textiles has been of a high standard. Thus, as a result of these standards, dispersable anthraquinone dyestuffs which impart clear blue to greenish blue colors and which have high sublimation fastness, light fastness, washing fastness after the finish processing of the resin (post processing durability), have been required. However, satisfactory dyestuffs which meet these standards have not been obtained. For example, conventional anthraquinone dyestuffs, aminoanthraquinone or mixtures thereof have low affinity to synthetic fibers, especially polyester fibers, and have a relatively low fastness so that they are not suitable for practical applications.

A need, therefore, exists for dispersable anthraquinone dyestuffs which have a high affinity for synthetic fibers and which have excellent fastness.

SUMMARY OF THE INVENTION

Accordingly, one object of the invention is to provide dispersable anthraquinone dyestuffs which impart clear blue to greenish blue colors to synthetic fibers, especially polyester fibers, and which have excellent values for the various types of fastness factors and level dyeing properties.

Another object of the invention is to provide a process for preparing the anthraquinone dyestuffs by a simple method.

Briefly, these objects and other objects of this invention as hereinafter will become readily apparent can be attained by dispersable anthraquinone dyestuffs which comprises dioxy-monoanilino-monoamino-anthraquinone dyestuffs having the following formulas

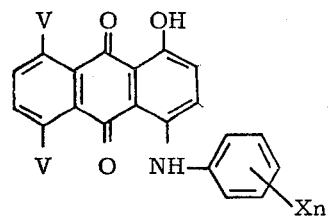 (1)

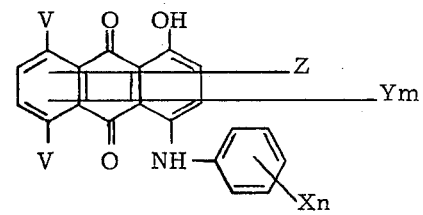 (2)

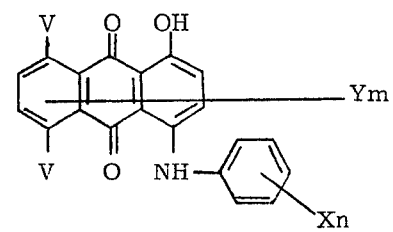 (3)

wherein V represents a hydroxy group at one position and an amino group at the second position, X and Y represent halogen atoms, m and n represent integers from 0 – 3 and Z represents a hydrogen atom, a halogen atom or a methyl group substituted at a position adjacent to the hydroxy group. These anthraquinone dyestuffs have a high affinity for synethetic fibers, especially polyester fibers, and impart clear blue colors to the fibers while having excellent light fastness, sublimation fastness and washing fastness after finish processing of the resin (fast processing durability).

DETAILED DESCRIPTION OF PREFERRED EMBODIMENTS

The dispersable anthraquinone dyestuffs of this invention having the formulas shown above can be prepared by reducing anthraquinone compounds having the following formulas with a reducing agent, and if necessary, halogenating the products with a halogenating agent.

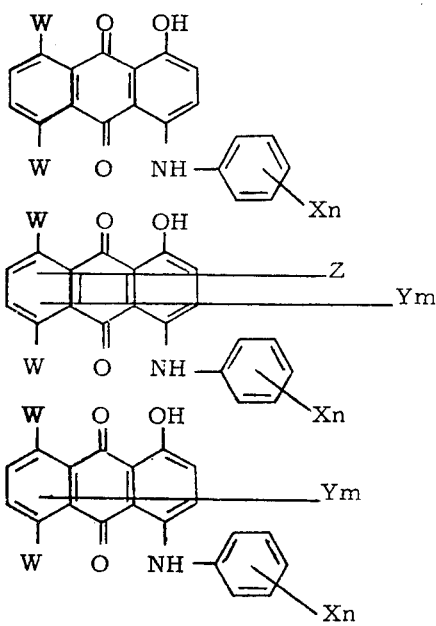

(4)

(5)

(6)

In the formulas, W represents hydroxy groups and nitro groups, and X, Y, Z, m and n are defined as above.

It is possible to reduce the above-mentioned starting materials having formulas (4), (5) and (6) with a reducing agent in the range of 20 – 100% by weight. Sometimes, it can be advantageous to form a mixture of 20 – 80% by weight of an anthraquinone compound having the formula (1), (2) or (3) (this invention) with 80 – 20% be weight of an anthraquinone compound having the formula (4), (5) or (6) (starting compound). Although, it is only common sense that mixtures of the two types of dyestuffs cause color changes in a continuous dyeing process. Also, when this mixture is used, special synergistic effects such as patchdyeing, barrenness, color rendering and build up may result.

The scope of the anthraquinone dyestuffs of this invention include the following:

FORMULA 1

1,5-dioxy-4-(2',4'-dichloroanilino)-8-aminoanthraquinone;
1,8-dioxy-4-(2',4'-dichloroanilino)-5-aminoanthraquinone, and mixture thereof;
1,5-dioxy-4-(2',4',6'-trichloroanilino)-8-aminoanthraquinone;
1,8-dioxy-4-(2',4',6'-trichloroanilino)-5-aminoanthraquinone, and mixture thereof;
1,5-dioxy-4-(3',4'-dibromoanilino)-8-aminoanthraquinone;
1,8-dioxy-4-(3',4'-dibromoanilino)-5-aminoanthraquinone, and mixture thereof;
1,5-dioxy-4-(3',4'-dichloroanilino)-8-aminoanthraquinone;
1,8-dioxy-4-(3',4'-dichloroanilino)-5-aminoanthraquinone, and mixture thereof;
1,5-dioxy-4-(3'-chloro-4'-bromoanilino)-8-aminoanthraquinone;
1,8-dioxy-4-(3'-chloro-4'-bromoanilino)-5-aminoanthraquinone, and mixtures thereof.

FORMULA 2

2-methyl-1,5-dioxy-4-(anilino)-8-aminoanthraquinone;
2-methyl-1,8-dioxy-4-(anilino)-5-aminoanthraquinone, and mixture thereof;
2-methyl-1,5-dioxy-4-(2'-chloroanilino)-8-aminoanthraquinone;
2-methyl-1,8-dioxy-4-(2'-chloroanilino)-5-aminoanthraquinone, and mixture thereof;
2-methyl-1,5-dioxy-4-(4'-chloroanilino)-8-aminoanthraquinone;
2-methyl-1,8-dioxy-4-(4'-chloroanilino)-5-aminoanthraquinone, and mixture thereof;
2-methyl-1,5-dioxy-4-(2'-bromoanilino)-8-aminoanthraquinone;
2-methyl-1,8-dioxy-4-(2'-bromoanilino)-5-aminoanthraquinone, and mixture thereof;
2-methyl-1,5-dioxy-4-(4'-bromoanilino)-8-aminoanthraquinone;
2-methyl-1,8-dioxy-4-(4'-bromoanilino)-5-aminoanthraquinone, and mixture thereof;
2-methyl-1,5-dioxy-4-(2',4'-dichloroanilino)-8-aminoanthraquinoine;
2-methyl-1,8-dioxy-4-(2',4'-dichloroanilino)-5-aminoanthraquinone, and mixture thereof;
2-methyl-1,5-dioxy-4-(3',4'-dichloroanilino)-8-aminoanthraquinone;
2-methyl-1,8-dioxy-4-(3',4'-dichloroanilino)-5-aminoanthraquinone, and mixture thereof;
2-methyl-1,5-dioxy-4-(2',4'-dibromoanilino)-8-aminoanthraquinone;
2-methyl-1,8-dioxy-4-(2',4'-dibromoanilino)-5-aminoanthraquinone, and mixture thereof;
2-methyl-1,5-dioxy-4-(3',4'-dibromoanilino)-8-aminoanthraquinone;
2-methyl-1,8-dioxy-4-(3',4'-dibromoanilino)-5-aminoanthraquinone, and mixture thereof;
2-methyl-1,5-dioxy-4-(2',4',6'-trichloroanilino)-8-aminoanthraquinone;
2-methyl-1,8-dioxy-4-(2',4',6'-trichloroanilino)-5-aminoanthraquinone, and mixture thereof; and
anthraquinone compounds having chlorine atom or bromine atom on the above anthraquinone ring.

FORMULA 3

1,5-dioxy-2-chloro-4-(2',4'-dichloroanilino)-8-amino-anthraquinone;
1,8-dioxy-2-chloro-4-(2',4'-dichloroanilino)-5-aminoanthraquinone, and mixture thereof;
1,5-dioxy-2-chloro-4-(3',4'-dichloroanilino)-8-aminoanthraquinone;
1,8-dioxy-2-chloro-4-(3',4'-dichloroanilino)-5-aminoanthraquinone, and mixture thereof;
1,5-dioxy-2-chloro-4-(2',4',6'-trichloroanilino)-8-aminoanthraquinone;
1,8-dioxy-2-chloro-4-(2',4',6'-trichloroanilino)-5-aminoanthraquinone, and mixture thereof;
1,5-dioxy-2-chloro-4-(2',4'-dibromoanilino)-8-aminoanthraquinone;

1,8-dioxy-2-chloro-4-(2',4'-dibromoanilino)-5-aminoanthraquinone, and mixture thereof;
1,5-dioxy-2-chloro-4-(3',4'-dibromoanilino)-8-aminoanthraquinone;
1,8-dioxy-2-chloro-4-(3',4'-dibromoanilino)-5-aminoanthraquinone, and mixture thereof;

aminoanthraquinone compounds having average 0.1 – 2 preferably 0.3 – 2 of chlorine atom or bromine atom on the above anthraquinone ring;
1,5-dioxy-4-(2',4'-dichloroanilino)-8-aminoanthraquinone;
1,8-dioxy-4-(2',4'-dichloroanilino)15-aminoanthraquinone, and mixture thereof;
1,5-dioxy-4-(3'4,'-dichloroanilino)-8-aminoanthraquinone;
1,8-dioxy-4-(3',4'-dichloroanilino)-5-aminoanthraquinone, and mixture thereof;
1,5-dioxy-4-(2',4',6'-trichloroanilino)-8-aminoanthraquinone;
1,8-dioxy-4-(2',4',6'-trichloroanilino)-5-aminoanthraquinone, and mixture thereof;
1,5-dioxy-4-(2',4'-dibromoanilino)-8-aminoanthraquinone;
1,8-dioxy-4-(2',4'-dibromoanilino)-5-aminoanthraquinone, and mixture thereof;
1,5-dioxy-4-(3',4'-dibromoanilino)-8-aminoanthraquinone;
1,8-dioxy-4-(3',4'-dibromoanilino)-5-aminoanthraquinone, and mixture thereof;
anthraquinone compounds having average 1.0 – 3 preferably 1.2 – 2.1 of chlorine atom or bromine atom on the above anthraquinone ring.

The starting compounds having the formula (4) which are used for the preparation of dyestuffs having the formula (1), are as follows:
1,5-dioxy-4-(2',4'-dichloroanilino)-8-nitroanthraquinone;
1,8-dioxy-4-(2',4'-dichloroanilino)-5-nitroanthraquinone, and mixture thereof;
1,5-dioxy-4-(2',4',6'-trichloroanilino)-8-nitroanthraquinone;
1,8-dioxy-4-(2',4',6'-trichloroanilino)-5-nitroanthraquinone, and mixture thereof;
1,5-dioxy-4-(3',4'-dibromoanilino)-8-nitroanthraquinone;
1,8-dioxy-4-(3',4'-dibromoanilino)-5-nitroanthraquinone, and mixture thereof;
1,5-dioxy-4-(3',4'-dichloroanilino)-8-nitroanthraquinone;
1,8-dioxy-4-(3'3'-dichloroanilino)-5-nitroanthraquinone, and mixture thereof;
1,5-dioxy-4-(3'-chloro-4'-bromoanilino)-8-nitroanthraquinone;
1,8-dioxy-4-(3'-chloro-4'-bromoanilino)-5-nitroanthraquinone, and mixture thereof.

The starting materials having the formula (4) can be prepared as follows. A dioxy-dinitroanthraquinone such as 1,5-dioxy-4, 8-dinitroanthraquinone is reacted with dihaloaniline or trihaloaniline in the presence or in the absence of a solvent with heat, so that one of the two nitro groups is substituted with the dihaloanilino group or trihaloanilino group resulting in a substituted dioxy(di- or tri-haloanilino)-mononitroanthraquinone.

The starting compounds having the formula (5) which are used for the preparation of the dyestuff having the formula (2), include the following:
2-methyl-1, 5-dioxy-4-anilino-8-nitroanthraquinone;
2-methyl-1, 8-dioxy-4-anilino-5-nitroanthraquinone, and mixtures thereof;
2-methyl-1, 5-dioxy-4-(monohaloanilino)-8-nitroanthraquinone;
2-methyl-1, 8-dioxy-4-(monohaloanilino)-5-nitroanthraquinone, and mixtures thereof;
2-methyl-1, 5-dioxy-4-(dihaloanilino)-8-nitroanthraquinone;
2-methyl-1, 8-dioxy-4-(dihaloanilino)-5-nitroanthraquinone, and mixtures thereof; and the same anthraquinone compounds which contain a chlorine atom or a bromine atom substituted on one of the anthraquinone rings.

The starting compounds (5) can be prepared by the conventional process. For example, 2-methyl-dioxy-dinitroanthraquinone is reacted with aniline or a haloaniline in the presence or in the absence of a solvent with heat in order to replace one of the two nitro groups with an anilino group or a haloanilino group to give 2-methyl-dioxy-anilino-or haloanilino-mononitroanthraquinone. Also, 2-methyl-dioxy-dinitroanthraquinone can be reacted with a halogen such as chlorine or bromine at relatively low temperature to give 2-methyl-dioxy-dinitrohaloanthraquinone. The halogenated anthraquinone derivative can then be reacted with aniline derivatives as stated above in order to substitute one of the two nitro groups with an anilino group to give 2-methyl-dioxy-anilino-mononitro-haloanthraquinone.

The starting compounds having the formula (6) which are used for the preparation of dyestuffs having the formula (3) include the following:
1,5-dioxy-2-chloro-4(2',4'-dichloroanilino)-8-nitroanthraquinone;
1,8-dioxy-2-chloro-4(2',4'-dichloroanilino)-5-nitroanthraquinone, and mixtures thereof;
1,5-dioxy-2-chloro-4(3',4'-dichloroanilino)-8-nitroanthraquinone;
1,8-dioxy-2-chloro-4(3',4'-dichloroanilino)-5-nitroanthraquinone, and mixtures thereof;
1,5-dioxy-2-chloro-4(2',4',6'-trichloroanilino)-8-nitroanthraquinone;
1,8-dioxy-2-chloro-4(2',4',6'-trichloroanilino)-5-nitroanthraquinone, and mixtures thereof;
1,5-dioxy-2-chloro-4(2',4'-dibromoanilino)-8-nitroanthraquinone;
1,8-dioxy-2-chloro-4(2',4'-dibromoanilino)-5-nitroanthraquinone, and mixtures thereof;
1,5-dioxy-2-chloro-4(3',4'-dibromoanilino)-8-nitroanthraquinone;
1,8-dioxy-2-chloro-4(3',4'-dibromoanilino)-5-nitroanthraquinone, and mixtures thereof;
and the same anthraquinone compounds which contain an average of 0.1 – 2, preferably 0.3 – 2 chlorine atoms or bromine atoms substituted per anthraquinone ring; and
1,5-dioxy-4(2',4'-dichloroanilino)-8-nitroanthraquinone;
1,8-dioxy-4(2',4'-dichloroanilino)-5-nitroanthraquinone, and mixtures thereof;
1,5-dioxy-4(3',4'-dichloroanilion)-8-nitroanthraquinone;
1,8-dioxy-4(3',4'-dichloroanilino)-5-nitroanthraquinone, and mixtures thereof;
1,5-dioxy-4(2',4',6'-trichloroanilino)-8-nitroanthraquinone;
1,8-dioxy-4(2',4',6'-trichloroanilino)-5-nitroanthraquinone, and mixtures thereof;

1,5-dioxy-4(2',4'-dibromoanilino)-8-nitroanthraquinone;

1,8-dioxy-4(2',4'-dibromoanilino)-5-nitroanthraquinone, and mixtures thereof;

1,5-dioxy-4(3',4'-dibromoanilino)-8-nitroanthraquinone;

1,8-dioxy-4(3',4'-dibromoanilino)-5-nitroanthraquinone, and mixtures thereof; and the same anthraquinone compounds which contain an average of 1.1 – 3, preferably 1.2 – 2.1 chlorine atoms or bromine atoms substituted per anthraquinone ring.

Suitable solvents for the reduction of the above starting materials in the process of this invention include preferably water and mineral acids such as sulfuric acid, hydrochloric acid, and the like; organic acids such as formic acid, acetic acid, and the like and aqueous organic solvents such as the lower alcohols including methanol, ethanol, and the like.

Suitable reducing agents include metals such as iron, zinc, tin; alkali metal sulfides such as sodium sulfide, sodium polysulfide, sodium hydrosulfide, and the like; ferrous sulfate, glucose, hydrosulfite, sodium acid sulfite, and the like. In general, it is preferable to use combinations of the metals (Fe, Sn, etc.) and of the mineral acid or organic acids, zinc powder in an aqueous alkaline solution; alkali metal sulfides; ferrous sulfate or glucose and aqueous alkaline solutions or aqueous organic solvents or mixtures thereof.

The amount of solvent employed can be from 5 – 60 times the amount of starting material. The amount of reducing agent used can be from 1.5 – 5 moles per mole of the starting material, and it need not be present in large excess quantities. The reduction is conducted at 50 – 120°C, preferably 80 – 100°C. In the reaction, the starting material need not be dissolved in the solvent, and usually, the reaction can be completed while in a suspension. After the reaction while the reaction products are still dissolved in the solvent, the solution is added to a large amount of water to precipitate crystals of the product which are filtered to separate the product. When the reaction product is in the form of a suspension, the reaction product is filtered directly, or can be diluted with water and then filtered to separate the product.

When starting materials are used which contain no halogen atoms in the anthraquinone ring system as in some compounds of formula (5), 2-methyl-dioxy-monoamino-monoanilino anthraquinones can be treated with a halogenating agent to prepare dyestuffs which are the same as those dyestuffs prepared from starting materials containing halogen atoms in the anthraquinone ring systems. Suitable halogenating agents include halogens such as chlorine, bromine; or sulfur halides such as sulfurylchloride.

suitable solvents include mineral acids and organic acids such as hydrochloric acid, sulfuric acid, acetic acid and the like; and benzene based organic solvents such as nitrobenzene, o-dichlorobenzene and the like. When an anthraquinone dyestuff is treated with a halogenating agent, the halogen atoms are usually substituted for hydrogen atoms on the ring adjacent to the hydroxy group or amino group. The maximum amount of halogen substitution involves 3 halogen atoms. Preferably, however, from 0.2 – 2 halogen atoms are substituted per molecule.

The anthraquinone dyestuffs of this invention can be prepared by the abovementioned process. The dyestuffs of this invention having the formulas indicated, dye synthetic fibers such as polyester fibers, cellulose ester fibers and the like, and impart a light blue to greenish blue color to the fabric. The dyestuffs have excellent level dyeing properties and fastness properties.

The dispersable anthraquinone dyestuffs or mixtures thereof can be dispersed in aqueous media to prepare dye baths or can be prepared in the form of a printing paste by a conventional method. Dip dyeing or printing processes can be conducted with the dye preparations. In order to prepare the dye baths or the printing pastes, it is preferable to use a dispersing agent such as the condensate of formaldehyde and naphthalenesulfonic acid; and the condensate of formaldehyde and oxynaphthalenesulfonic acid and cresol; higher alcohol sulfate, higher alkylbenzenesulfonates and the like.

If necessary, a carrier such as phenylphenols, chlorobenzenes, hydroxybenzoates, alkylnaphthalenes and the like may be added.

In the dip dyeing process, dye baths are prepared which disperse the dyestuffs of this invention in a concentration depending upon the color desired. High temperature dyeing is conducted with fabrics at temperature of 120 – 130°C for 60 – 120 minutes in the dye baths and then the dyed fabrics are subjected to a soaping operation. Carrier dyeing is conducted at 80 – 100°c for 60 – 120 minutes in the presence of a suitable amount of carrier, and then the soaping operation is conducted.

The dyed fibers, especially the dyed polyester fibers, have a light blue color and possess superior fastness compared to the known dyestuffs, and are durable to various finishing processes which promote the value of the produts. The fabrics are satisfactory for sale in the market and, thus, the industrial value of the dyestuffs of this invention is remarkably high.

Having generally described the invention, a further understanding can be obtained by certain specific examples which are provided herein for purpose of illustration only and are not intended to be limiting in any manner.

In the following examples, the terms "part" and "percent" respectively designate part by weight and percent by weight unless specified otherwise. The type of fastness of the dispersable anthraquinone dyestuffs of this invention and the known dyestuffs used as reference standards were measured by the following methods.

| | | |
|---|---|---|
| 1. | Test fabric: | polyester textile fabric |
| 2. | Light fastness: | JIS L 1044-1959 Fade meter method |
| 3. | Sublimation fastness: | JIS L 0879-1969 180°C × 30 sec. test (using an iron tester) |
| 4. | Washing fastness after resin finishing (post finishing fastness) The dyed fabric is finished with a resin (Sumitex UN-1- tradename of Sumitomo Chemical Co.) and then the finished fabric is plied with white nylon fabric and washed in accordance with AATCC 61-1965 II A method. The degree of coloring is then observed. | |

EXAMPLE 1

10 Parts of 1,5-dioxy-4-(3',4'-dichloroanilino)-8-nitroanthraquinone was added to a solution of 8 parts of sodium hydroxide in 400 parts of water, and the mixture was uniformly stirred and heated to 80°C. 12 Parts of glucose was gradually added to the mixture and reacted at 80°– 85°C for 3 hours. The reaction product was cooled to ambient temperatures and the precipitated cake was filtered and washed with water until the aqueous effluent was neutral, the product was dried to yield 8.9 parts of blue crystals of 1,5-dioxy-4-(3',4'-dichloroanilino)-8-aminoanthraquinone. An elemental analysis of the product gave the following results.

|  | C% | H% | N% | Cl% |
|---|---|---|---|---|
| Calculated | 57.85 | 2.91 | 6.75 | 17.08 |
| Found | 57.90 | 2.86 | 6.69 | 17.00 |

The product had a maximum absorption wavelength of 630 m$\mu$ in acetone, and polyester fibers dyed with the dyestuff had a clear blue color and had excellent level dyeing properties. The various fastness values were a light fastness of grade 6, a sublimation fastness (180°C × 30 sec.) of grade 4 – 5; and a washing fastness after resin finishing of grade 4 (post finishing fastness).

A mixture of 60% 1,5-dioxy-4-(3',4'-dichloroanilino)-8-nitroanthraquinone and 40% 1,8-dioxy-4-(3',4'-dichloroanilino)-5-nitroanthraquinone was used as a starting material in the reaction described. The results of the reduction reaction gave clear blue dyestuff possessing excellent level dyeing properties, and good fastness values were obtained.

EXAMPLE 2

10 Parts of a mixture of 60% 1,5-dioxy-4-(2',4',6'-trichloranilino)-8-nitroanthraquinone and 40% 1,8-dioxy-4-(2',4',6'-trichloroanilino)-5-nitroanthraquinone were added to a solution of 0.14 part sodium hydroxide and 37.5 parts sodium hydrosulfide in 480 parts of water, and the mixture was heated to 90°C and reacted at 90 – 95°C for 4 hours. After the reaction, the reaction product was cooled to ambient temperatures. The precipitated crystals were filtered and were washed with water until the filtrate became neutral. The product was dried to yield 8.9 parts of blue crystals.

The product had a maximum absorption wavelength of 628 m$\mu$ in acetone and polyester fibers dyed with the dyestuff had a clear blue color and possessed excellent level dyeing properties. The various fastness values were a light fastness of grade 6, a sublimation fastness of grade 4 – 5 and a washing fastness after resin finishing of grade 4.

1,5-dioxy-4-(2',4'-dibromoanilino)-8-nitroanthraquinone was used as a starting material in this reaction to yield dyestuffs which impart a greenish blue color to fabrics. The dyestuff has excellent level dyeing properties and good fastness values for polyester fibers.

EXAMPLE 3

10 Parts of 1,5-dioxy-2-methyl-4-(2'-chloroanilino)-8-nitroanthraquinone were added to 39 parts of sodium hydrosulfide and 400 parts of a 2% aqueous sodium hydroxide solution, and the mixture was heated to 90°–95°C and reacted for 3 hours. After the reaction, the precipitated crystals formed upon cooling were filtered and washed with water until the rinse became neutral. The product was dried to yield 8.6 parts of 1,5-dioxy-2-methyl-4-(2'-chloroanilino)-8-aminoanthraquinone.

The product had a maximum absorption wavelength of 638 m$\mu$ in acetone, and polyester fibers dyed with the dyestuff possessed excellent level dyeing properties. The various fastness values were a sublimation fastness of grade 4 – 5, a light fastness of grade 6, and a washing fastness of grade 4.

A mixture of 60% 1,5-dioxy-2-methyl-4-(2'-chloroanilino)-8-nitroanthraquinone and 40% 1,8-dioxy-2-methyl-4-(2'-chloroanilino)-5-nitroanthraquinone was used as the starting material in the process described. The resulting mixed dyestuff had characteristics similar to the previously prepared dyestuff.

EXAMPLE 4

The process of Example 3 was followed except that 1,5-dioxy-2-methyl-4-(2',4',6'-tribromoanilino)-8-nitroanthraquinone was used as the starting material. 1,5-Dioxy-2-methyl-4-(2',4',6'-tribromoanilino)-8-aminoanthraquinone was obtained as the product. The product had a maximum absorption wavelength of 642 m$\mu$ in acetone, and polyester fibers dyed with the dyestuff had a clear greenish blue color with a sublimation fastness of grade 4 – 5, a light fastness of grade 6 and a washing fastness of grade 4.

EXAMPLE 5

The process of Example 3 was followed except that bromine substituted 1,5-dioxy-2-methyl-4-anilino-8-nitroanthraquinone (0.8 atom of Br substituted) was used as the starting material. Bromine substituted 1,5-dioxy-2-methyl-4-anilino-8-aminoanthraquinone was obtained as the product of the reduction reaction. The product had a maximum absorption wavelength of 641 m$\mu$ in acetone, and also imparted a sublimation fastness of grade 4 – 5, light fastness of grade 6, and a washing fastness of grade 4 to fabrics treated with the dyestuff. The starting material was prepared by dinitrating 2-methylanthraquinone in a mixed acid or in concentrated nitric acid, and the resulting 2-methyl-1,5-dinitroanthraquinone was reacted with an alcohol or phenol in the presence of an alkali metal hydroxide. The resulting 2-methyl-1,5-dialkoxy (or diphenoxy)-anthraquinone produced by the substitution reaction was again dinitrated by the conventional method and the product was hydrolyzed. The resulting 2-methyl-1,5-dioxy-4,8-dinitroanthraquinone was treated with bromine atom, and the bromine substituted-1,5-dioxy-2-methyl-4,8-dinitroanthraquinone produced was heated with aniline to yield the product.

EXAMPLE 6

10 Parts of 1,5-dioxy-2-methyl-4-(2'-chloroanilino)-8-aminoanthraquinone was dissolved in 90 parts of 100% H$_2$SO$_4$ and the mixture was heated to 50°C after adding 0.1 part of iodine. 4.7 Parts of bromine was also added dropwise to the mixture at the same temperature, and the solution was reacted until bromine had almost disappeared. After the reaction, the product was cooled and was transferring by pouring into 1000 parts of ice water. The precipitated crystals were filtered and washed until the effluent was neutral. The crystals were dried to yield 9.8 parts of bromine substituted-1,5-dioxy-2-methyl-4-(2'-chloroanilino)-8-aminoanthraquinone having an average bromine atom content of 1.2.

The product had a maximum adsorption wavelength of 644 m$\mu$ in acetone, and the polyester fiber dyed with the dyestuff had a clear greenish blue color and possessed excellent level dyeing properties. The dyed fabric had a sublimation fastness of grade 4 – 5, a light fastness of grade, 6, and a washing fastness of grade 4. A mixture of 60% 1,5-dioxy-2-methyl-4-(2′-chloroanilino)-8-aminoanthraquinone and 40% 1,8-dioxy-2-methyl-4-(2′-chloroanilino)-5-aminoanthraquinone was used as the starting material in the process. A mixture of the dyestuffs having similar fastness values was obtained.

EXAMPLE 7

10 Parts of a mixture of 50% bromine substituted-1,5-dioxy-2-methyl-4-(3′-chloroanilino)-8-nitroanthraquinone and 50% bromine substituted-1,8-dioxy-2-methyl-4-(3′-chloroanilino)-5-nitroanthraquinone (an average of 1.1 bromine atoms were substituted per anthraquinone ring), were added to 380 parts of a 1.8% aqueous potassium hydroxide solution and 18 parts of glucose. The mixture was heated and reacted at 30° – 85°C for 4 hours. After the reaction, the solution was cooled and the precipitated crystals were filtered and washed with water until the effluent was neutral. The crystals were dried to yield 9 parts of the product. The product had a maximum absorption wavelength of 644 m$\mu$ in acetone, and polyester fibers dyed with the dyestuff had a greenish blue color and had excellent level dyeing properties. The dyed fabrics had a sublimation fastness of grade 4 – 5, a light fastness of grade 6, and a washing fastness of grade 4.

EXAMPLE 8

The procedure of Example 7 was followed except that chlorine substituted 1,5-dioxy-2-methyl-4-(2′,4′-dichloroanilino)-8-nitroanthraquinone was used as the starting material. Chlorine substituted 1,5-dioxy-2-methyl-4-(2′,4′-dichloroanilino)-8-aminoanthraquinone (an average of 0.5 chlorine atoms were substituted) was prepared by this procedure. The product had a maximum absorption wavelength of 642 m$\mu$ in acetone, and polyester fibers dyed with the dyestuff had a sublimation fastness of grade 4 – 5, a light fastness of grade 6 and a washing fastness of grade 4.

EXAMPLE 9

The procedure of Example 7 was followed except that chlorine substituted 1,5-dioxy-2-methyl-4-(2′-bromoanilino)-8-nitroanthraquinone was used as the starting material. Chlorine substituted 1,5-dioxy-2-methyl-4-(2′-bromoanilino)-8-aminoanthraquinone (an average of 1.3 chlorine atoms were substituted) was prepared by this procedure. The product had a maximum absorption wavelength of 641 m$\mu$ in acetone, and polyester fibers dyed with the dyestuff had a sublimation fastness of grade 4–5, a light fastness of grade 6 and a washing fastness of grade 4.

EXAMPLE 10

10 Parts of 1,5-dioxy-2-methyl-4-(3′,4′-dibromoanilino)-8-nitroanthraquinone was dissolved in 200 parts of 90% sulfuric acid, and heated to 80°C. 6.5 Parts of iron powder were added to the mixture and the mixture reacted at 85° – 90°C for 10 hours. After the reaction, the reaction product was cooled to ambient temperatures and filtered. The filtrate was poured into 2000 parts of ice water and the precipitate was filtered, washed with water until the effluent was neutral, and dried to yield 8.9 parts of blue crystals.

Polyester fabrics dyed with the product had excellent level dyeing properties and fastness values.

EXAMPLE 11

10 Parts of 1,8-dioxy-2-methyl-4-(4′-bromoanilino)-5-nitroanthraquinone were added to 500 parts of a 2.5% aqueous sodium hydroxide solution and 13 parts of glucose. The mixture was heated and reacted at 80° – 85°C for 3.5 hours. After the reaction, the reaction product was cooled and the precipitated crystals were filtered, washed with water until the effluent was neutral and dried. The dried cake was added to 80 parts of nitrobenzene and was maintained at 20°C. Chlorine gas was then introduced to the mixture. The reaction was stopped when the chlorine substitution reached a 1 : 1 ratio with the parent anthraquinone dyestuff. This was determined by measuring samples from the reaction mixture and analyzing the extent of chlorine atom substitution after diluting with methanol.

After the reaction, the reaction product was diluted with 100 parts of methanol and the precipitated crystals were filtered, washed with methanol and with water and dried to yield 9.4 parts of blue crystals. The polyester fibers dyed with the product had a clear greenish blue color and had excellent level dyeing properties and fastness values.

EXAMPLE 12

10 Parts of 1,5-dioxy-2-chloro-4-(2′,4′-dichloroanilino)-8-nitroanthraquinone were added to a solution of 8 parts of sodium hydroxide and 37 parts of sodium hydrosulfide in 350 parts of water, and the mixture was uniformly stirred and reacted at 90° – 95°C for 3 hours. The reaction mixture was cooled to ambient temperatures and the precipitated cake was filtered, washed with water until the effluent was neutral, and dried to yield 9.8 parts of 1,5-dioxy-2-chloro-4-(2′,4′-dichloroanilino)-8-aminoanthraquinone.

The product had a maximum absorption wavelength of 642 m$\mu$ in acetone, and polyester fibers dyed with the dyestuff had a clear blue color and had excellent level dyeing properties and color rendering properties. The dyed fabrics had a sublimation fastness of grade 4 – 5, and a light fastness of grade 6.

The process above was repeated except that 1,5-dioxy-2-chloro-4-(2′,4′, -dibromoanilino)-8-nitroanthraquinone was used as a starting material. Polyester fibers treated with the corresponding dyestuff had excellent level dyeing properties and fasteness values.

EXAMPLE 13

10 Parts of 60% 1,5-dioxy-2-chloro-4-(3′,4′-dichloroanilino)-8-nitroanthraquinone and 40% 1,8-dioxy-2-chloro-4-(3′,4′-dichloroanilino)-5-nitroanthraquinone were added to 500 parts of a 1.8% aqueous sodium hydroxide solution. 39 Parts of sodium hydrosulfide was added to the mixture, and the mixture was reacted at 90° – 95°C for 3 hours and then cooled to ambient temperatures. The precipitated crystals were filtered, and washed with water until the effluent was neutral and dried.

The dried product was dissolved in 90 parts of 100% sulfuric acid and 1 part of iodine was added to it and the mixture was heated to 50°C. Bromine was added dropwise to the mixture maintained at 50° – 60°C. The reaction was stopped when the extent of bromine substitution reached a level of 0.8 bromine atoms per anthraquinone molecule. This was determined by measurements of samples from the reaction mixture. Bromine atom substitution was determined after the product was isolated by elemental analysis. After the reaction, the reaction solution was cooled to ambient temperatures and was poured into 900 parts of ice water. The precipitated crystals were filtered, washed with water and dried to yield 9.9 parts of blue crystals. The polyester fiber dyed with the product had a greenish blue color and had excellent fastness values.

The procedure above was followed except that 1,5-dioxy-2-chloro-4-(3',4'-dichloroanilino)-8-nitroanthraquinone or 1,5-dioxy-2-chloro-4-(2',4'-dichloroanilino)-8-nitroanthraquinone was used as the starting material. The starting materials were reduced and reacted with bromine until the extent of bromine substitution reached values of 1.0 atoms and 0.3 atom respectively. The reaction products were treated the same as before. The polyester fibers dyed with the product had a clear greenish blue color and had excellent level dyeing properties and fastness values.

EXAMPLE 14

10 Parts of bromine substituted 1,5-dioxy-4-(2',4',6'-trichloroanilino)-8-nitroanthraquinone (an average of 1.3 bromine atoms were substituted) were added to 11 parts of sodium hydroxide in 500 parts of water, and the mixture was heated to 80°C. 13 Parts of glucose was added to the mixture, and the mixture was reacted for 3.5 hours. The reaction product was cooled to ambient temperatures and the precipitated crystals were filtered, washed with water and dried to yield 8.9 parts of blue crystals.

The product had a maximum absorption wavelength of 641 mμ in acetone, and polyester fibers dyed with the product had a light fastness of grade 6, a sublimation fastness of grade 5, and a washing fastness of grade 4.

The procedure described above was followed except that bromine substituted 1,5-dioxy-4-(3',4'-dichloroanilino)-8-nitroanthraquinone (an average of 1.4 bromine atoms were substituted on each anthraquinone ring) was used as the starting material. Polyester fibers dyed with the dyestuff had a blue color and had excellent level dyeing properties and fastness values.

EXAMPLE 15

10 Parts of 60% bromine substituted 1,5-dioxy-2-chloro4-(2',4'-dibromoanilino)-8-nitroanthraquinone and 40% bromine substituted 1,8-dioxy-2-chloro-4-(2',4'-dibromoanilino)-5-nitroanthraquinone (an average of 0.4 bromine atoms was substituted on each anthraquinone ring) were added to 550 parts of a 1.5% aqueous sodium hydroxide solution and the mixture was stirred for 1 hour at ambient temperatures. 88 Parts of ferrous sulfate ($FeSO_4 \cdot 7H_2O$) were added to the mixture at 40°C, and the mixture was heated and reacted to 60° – 65°C for 3 hours. After the reaction, hydrochloric acid was added dropwise to acidify the solution. The solution was kept at 70° – 73°C for 2 hours and the precipitate was filtered. The filtered cake was suspended in 300 parts of 2% hydrochloric acid, and the product was filtered, washed with water and dried to yield 9.0 parts of blue crystals.

Polyester fibers dyed with the product had a greenish blue color.

From the results obtained, it is evident that the dispersable blue dyestuffs of this invention have excellent properties and are especially durable to resin finishing treatments for improving the value of treated textiles compared with known dyestuffs. Thus, the dyestuffs contribute substantially to the improvement of the value of textile products.

Having now fully described this invention, it will be apparent to one of ordinary skill in the art that many changes and modifications can be made thereto without departing from the spirit or scope of the invention as set forth herein.

What is claimed as new and desire to be secured by Letters Patent of the United States is:

1. An anthraquinone dye having the formula

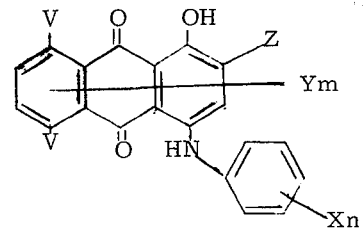

wherein X and Y represent chlorine or bromine; Z represents chlorine, bromine or methyl; one V substituent represents a hydroxyl group and the second V substituent represents an amino group; and $m$ and $n$ represent 0 – 3.

2. The dye of claim 1, wherein said dye has the formula

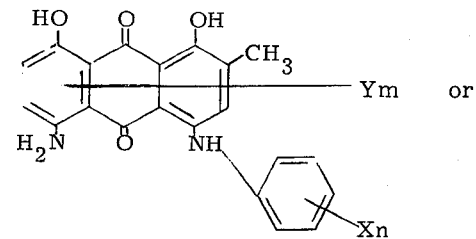

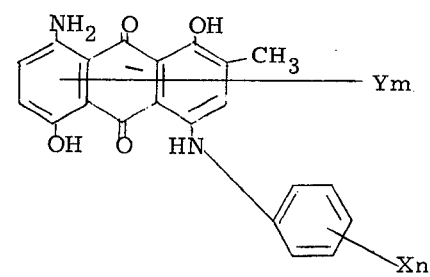

wherein X, Y, $m$ and $n$ are defined as above.

3. The dye of claim 1, wherein said dye has the formula

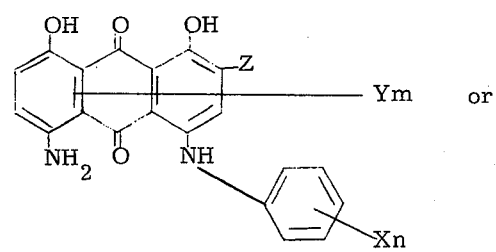

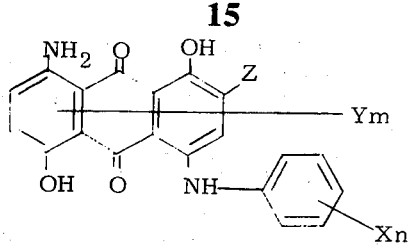
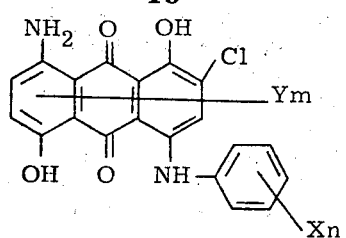
wherein X, Y, *m* and *n* are defined as above and Z is chlorine or bromine.
4. The anthraquinone dye of claim 3, having the formula
wherein X, Y, *m* and *n* are defined as above.
* * * * *